United States Patent [19]

D'Sidocky et al.

[11] Patent Number: 5,594,052
[45] Date of Patent: Jan. 14, 1997

[54] SULFUR VULCANIZABLE RUBBER CONTAINING SODIUM THIOSULFATE PENTAHYDRATE

[75] Inventors: Richard M. D'Sidocky, Ravenna; Shingo Futamura, Wadsworth, both of Ohio

[73] Assignee: The Goodyear Tire & Rubber Company, Akron, Ohio

[21] Appl. No.: 526,394

[22] Filed: Sep. 11, 1995

[51] Int. Cl.$^6$ ................... C08K 5/46; C08K 3/30
[52] U.S. Cl. .............. 524/83; 152/209 R; 524/419
[58] Field of Search ............ 152/209 R; 524/83, 524/419

[56] References Cited

U.S. PATENT DOCUMENTS

| | | | |
|---|---|---|---|
| 3,873,489 | 3/1975 | Thurn et al. | 260/33.6 |
| 3,938,574 | 2/1976 | Burmester et al. | 152/209 |
| 4,430,466 | 2/1984 | Cooper | 524/83 |
| 5,087,668 | 2/1992 | Sandstrom et al. | 525/237 |
| 5,162,409 | 11/1992 | Mroczkowski | 524/262 |
| 5,227,425 | 7/1993 | Rauline | 524/493 |

FOREIGN PATENT DOCUMENTS

| | | | |
|---|---|---|---|
| 0599643 | 6/1994 | European Pat. Off. | B60C 1/00 |
| 1060639 | 12/1983 | U.S.S.R. | C08L 9/00 |
| 1249036 | 8/1986 | U.S.S.R. | C08L 9/00 |

OTHER PUBLICATIONS

Yu. N. Nikitin, Vulcanization of Nitrile Rubber by Sulfides and Thiosulfates of Alkali and Alkaline Earth Metals, International Polymer Science and Technology, vol. 2, No. 6 (1975).

Ephraim, Fritz, Inorganic Chemistry, pp. 579–585 (1954).

*Primary Examiner*—Peter A. Szekely
*Attorney, Agent, or Firm*—Bruce J. Hendricks

[57] ABSTRACT

A method is disclosed for increasing the rate of vulcanization of a sulfur rubber composition comprising heating a sulfur vulcanizable rubber composition to a temperature ranging from 100° C. to 200° C., said rubber composition, containing a sulfur vulcanizable rubber, a sulfenamide compound and a hydrated thiosulfate. Addition of the hydrated thiosulfate to a sulfur vulcanizable rubber and a sulfenamide compound significantly increases the rate of vulcanization of the rubber.

18 Claims, No Drawings

SULFUR VULCANIZABLE RUBBER CONTAINING SODIUM THIOSULFATE PENTAHYDRATE

FIELD OF THE INVENTION

The present invention relates to increasing the rate of vulcanization of a sulfur curable rubber composition.

BACKGROUND OF THE INVENTION

The "rate of cure" is defined as the rate at which crosslinking and the development of the stiffness (modulus) of a rubber compound occurs. As the rubber compound is heated, the properties of the rubber compound change from a soft plastic to a tough elastic material. During the curing step, crosslinks are introduced, which connect the long polymer chains of the rubber. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of cure time. Through enhanced rates of cure, the cure time required to meet minimum states of cure can be reduced. Given the above, extensive research has been conducted in order to shorten the cure times of rubbers. Therefore, there exists a need for improved methods which enhance the rate of cure in the absence of imparting undesirable properties to the vulcanizate.

SUMMARY OF THE INVENTION

The present invention relates to the use of a sulfenamide compound and a hydrated thiosulfate in a sulfur vulcanizable rubber.

DETAILED DESCRIPTION OF THE INVENTION

There is disclosed a method for increasing the rate of vulcanization of a sulfur vulcanizable rubber composition by heating a sulfur vulcanizable composition to a temperature ranging from 100° C. to 200° C., said rubber composition comprising (a) a sulfur vulcanizable rubber (b) from 0.5 phr to 5 phr of a sulfenamide compound of the general formula:

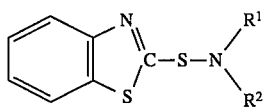

wherein $R^1$ is hydrogen, an acyclic aliphatic group having from about 1 to 10 carbon atoms, or a cyclic aliphatic group having from about 5 to 10 carbon atoms; and $R^2$ is hydrogen, a cyclic aliphatic group having from 5 to 10 carbon atoms or a mercaptobenzothiazolyl group of the formula:

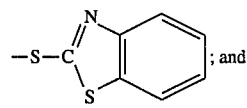

(c) from 0.05 to 10 phr of a hydrated thiosulfate.

There is also disclosed a sulfur vulcanizable composition comprising a sulfur vulcanizable rubber composition comprising (a) a sulfur vulcanizable rubber (b) from 0.5 phr to 5 phr of a sulfenamide compound of the general formula:

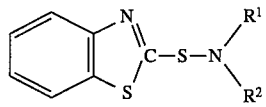

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms or a mercaptobenzothiazolyl group of the formula:

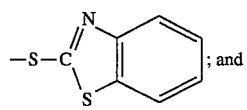

(c) from 0.05 to 10 phr of a hydrated thiosulfate.

The present invention may be used to vulcanize sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), styrene-butadiene copolymers, polyisoprene (including cis-1,4-polyisoprene), butyl rubber, styrene-isoprene copolymers, styrene-isoprene-butadiene terpolymers, methyl methacrylate-butadiene copolymers, methyl methacrylate-isoprene copolymers, as well as ethylene/propylene terpolymers, also known as ethylene/propylene/diene monomer (EPDM), and in particular, ethylene/propylene/dicyclopentadiene terpolymers. Mixtures of the above rubber may be used. The preferred rubber or elastomers are styrene/butadiene copolymer, polybutadiene, natural rubber and polyisoprene.

The term "phr" as used herein, and according to conventional practice, refers to "parts by weight of a respective material per 100 parts by weight of rubber, or elastomer".

The first essential component of the present invention is the hydrated thiosulfate. The hydrated thiosulfate that is used may vary. Representative examples of such hydrated thiosulfates include $BaS_2O_3 \cdot H_2O$, $K_2S_2O_3 \cdot 1.5\ H_2O$, $CaS_2O_3 \cdot 6H_2O$, $MgS_2O_3 \cdot 6H_2O$, $NiS_2O_3 \cdot 6H_2O$, $CoS_2O_3 \cdot 6H_2O$, $SrS_2O_3 \cdot 5H_2O$, $Na_2S_2O_3 \cdot 5H_2O$, $MnS_2O_3 \cdot 5H_2O$, $Li_2S_2O_3 \cdot 3H_2O$ and $CdS_2O_3 \cdot 2H_2O$. Preferably, the hydrated thiosulfate is $Na_2S_2O_3 \cdot 5H_2O$.

The hydrated thiosulfate used in the present invention may be added to the rubber by any conventional technique such as on a mill or in a Banbury. The amount of hydrated thiosulfate may vary widely depending on the type of rubber and other compounds present in the vulcanizable composition. Generally, the amount of hydrated thiosulfate is used in a range of from about 0.05 to about 10.0 phr with a range of 0.1 to about 5.0 phr being preferred.

For ease in handling, the sodium thiosulfate pentahydrate salt may be used per se or may be deposited on suitable carriers. Examples of carriers which may be used in the present invention include silica, carbon black, alumina, kieselguhr, silica gel and calcium silicate.

The above sulfenamide compound is the second essential component of the present invention. The sulfenamide is generally present in an amount of from about 0.5 to about 5 phr. Preferably, the sulfenamide is present in an amount ranging from about 0.70 to about 2.0 phr.

Representative of the sulfenamide compounds which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide and N-t-butylbis-(2-benzothiazylsulfen)amide. Preferably, the sulfenamide compound is N-cyclohexyl-2-benzothiazylsulfenamide.

The processing of the sulfur vulcanizable rubber is conducted in the presence of a sulfur vulcanizing agent. Examples of suitable sulfur vulcanizing agents include elemental sulfur (free sulfur), an amine disulfide, polymeric polysulfide or sulfur olefin adducts. Preferably, the sulfur vulcanizing agent is elemental sulfur. The sulfur vulcanizing agent may be used in an amount ranging from 0.5 to 8 phr, with a range of from 1.5 to 5.0 being preferred.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the sulfenamide compounds, additional accelerators are used to control the time and/or temperature required for vulcanization and to improve the properties of the vulcanizate. In one embodiment, only the sulfenamide may be used, i.e., primary accelerator. In another embodiment, combinations of a sulfenamide and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators other than the sulfenamides that may be used in the present invention are amines, disulfides, guanidines, thioureas, thiazoles, thiurams, dithiocarbamates and xanthates. If a second accelerator is used, the secondary accelerator is preferably a guanidine, dithiocarbamate or thiuram compound.

The rubber compositions of the present invention may contain sulfur containing organosilicon compounds.

Examples of suitable sulfur containing organosilicon compounds are of the formula:

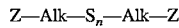

in which Z is selected from the group consisting of

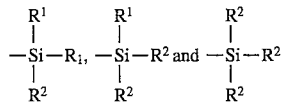

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis-(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'- bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis-(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is

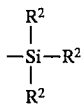

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound in a rubber composition will vary depending on the level of silica that is used. Generally speaking, the amount will range from 0.5 to 50 phr. Preferably, the amount will range from 1.5 to 8 phr. Depending on the desired properties, the weight ratio of the sulfur containing organosilicon compound to silica may vary. Generally speaking, the weight ratio will range from 1:100 to 1:5. Preferably, the weight ratio will range from 1:20 to 1:10.

When the sulfur containing organosilicon is present, the rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as hereinbefore referenced, may be as low as about 30 phr, but is preferably from about 45 to about 90 phr. It is to be appreciated that the sulfur containing organosilicon may be used in conjunction with a carbon black, namely pre-mixed with a carbon black prior to addition to the rubber composition, and such carbon black is to be included in the aforesaid amount of carbon black for the rubber composition formulation. The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred. The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

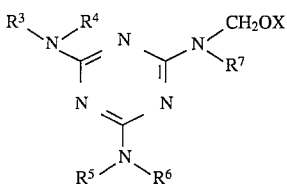

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis-(methoxymethyl)melamine, N,N',N"-trimethyl/N,N', - N"-trimethylolmelamine hexamethylolmelamine N,N', N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

When the compound of the present invention is used as a wire coat or bead coat for use in a tire, the compound generally contains an organo-cobalt compound which serves as a wire adhesion promoter. Any of the organo-cobalt compounds known in the art to promote the adhesion of rubber to metal may be used. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

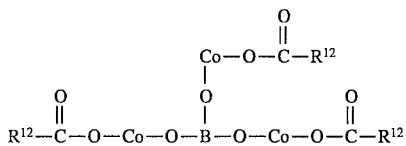

in which $R^{12}$ is an alkyl group having from 9 to 12 carbon atoms.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished stock composition. Accordingly, it may in general be stated that the amount of organo-cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, may be mixed in one or more non-productive mix stages. The terms "non-productive" and "productive" mix stages are well known to those having skill in the rubber mixing art.

Upon vulcanization of the sulfur vulcanizable composition at a temperature ranging from 100° C. to 200° C., the rubber composition of this invention can be used for various purposes. For example, the sulfur vulcanized rubber composition may be in the form of a tire, belt, hose, motor mounts, gaskets and air springs. In the case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The formulation set out in Table 1 was utilized for all the examples unless otherwise stated. The various additives were compounded using conventional rubber compounding techniques and the samples vulcanized by compression molding methods for 36 minutes at 150° C. unless otherwise stated.

TABLE 1

| Non-Productive | |
|---|---|
| Antioxidant[1] | 1.00 |
| Polyisoprene | 50.00 |
| SBR[2] 1712C | 69.75 |
| Processing Oil | 10.00 |
| Stearic acid | 2.00 |
| Zinc Oxide | 3.00 |
| Carbon Black[3] | 50.00 |
| Productive | |
| Sulfur | 1.75 |
| Sulfenamide[4] | 1.25 |
| Hydrated Thiosulfate | variable |

[1] diarylphenylenediamine
[2] emulsion polymerized styrene-butadiene rubber available from The Goodyear Tire & Rubber Co under the designation SBR 1712C
[3] N299
[4] N-cyclohexyl-2-benzothiazolesulfenamide

EXAMPLE 1

In this example, sodium thiosulfate pentahydrate is evaluated as a cure activator which can be used to beneficially reduce cure times without sacrificing cured physical properties of the resultant vulcanizate. The rubber compositions are identified herein as Samples A, B, C, D and E of Table 2 with Sample A acting as the control compound containing no sodium thiosulfate pentahydrate, and Samples B, C, D and E utilizing sodium thiosulfate pentahydrate varying amounts from 0.5 phr to 5.0 phr, respectively. The date illustrates that with the addition of sodium thiosulfate pentahydrate to control A cure times were substantially reduced (Sample B with 0.5 phr sodium thiosulfate pentahydrate gave a cure time reduction of 27.9 percent; Sample C, a 41.0 percent reduction with 1.0 phr sodium thiosulfate pentahydrate; Sample D, a 55.7 percent reduction with 2.0 phr sodium thiosulfate pentahydrate; and Sample E, a 60.7 percent reduction with 5.0 phr sodium thiosulfate pentahydrate) without significantly impacting the physical properties of the final vulcanizate.

TABLE 2

| Sample # | A | B | C | D | E |
|---|---|---|---|---|---|
| Sodium Thiosulfate Pentahydrate Monsanto Rheometer 1° Arc, 150° C. | none | 0.5 | 1.0 | 2.0 | 5.0 |
| $M_{HF}$ Torque Units (dNm) | 33 | 32.5 | 32.3 | 32.5 | 32 |
| $M_L$ Torque Units (dNm) | 8.0 | 8.5 | 8.0 | 8.0 | 7.5 |
| $M_{HF}$—$M_L$ Torque Units (dNm) | 25.0 | 24.3 | 24.3 | 24.5 | 24.5 |
| Cure Time, t'c(25), min | 20.0 | 12.2 | 8.3 | 4.5 | 3.6 |
| Cure Time, t'c(90), min | 30.5 | 22.0 | 18 | 13.5 | 12.0 |
| % Reduction in t'c(90) cure time | | 27.9 | 41.0 | 55.7 | 60.7 |
| Stress-Strain Data | | | | | |
| Modulus at 300% Elongation, MPa | 6.99 | 7.19 | 7.35 | 7.45 | 7.35 |
| Tensile Strength, MPa | 18.38 | 18.56 | 18.9 | 17.27 | 18.38 |
| Elongation at Break, % | 605 | 602 | 602 | 567 | 594 |
| Shore A Hardness at 100° C. | 48.4 | 48.6 | 48.4 | 49.6 | 48.3 |
| Percent Rebound at 100° C. | 59 | 60 | 59.4 | 60.4 | 59.8 |

EXAMPLE II

In this example, sodium thiosulfate pentahydrate, which can be used to beneficially reduce cure times, is compared to anhydrous sodium thiosulfate as a cure activator. The rubber compositions are identified herein as Samples F, G and H of Table 3 with Sample H acting as the control compound containing no sodium thiosulfate pentahydrate, Sample F containing sodium thiosulfate pentahydrate, and Sample G containing an equal molar equivalent of anhydrous sodium thiosulfate for comparison versus Sample F. The data unexpectedly shows that with anhydrous sodium thiosulfate (Sample G) cure times were not reduced when compared to the control (Sample H) whereas with sodium thiosulfate pentahydrate (Sample F) cure times were substantially reduced when compared to the control. This illustrates the unique and unobvious character of the hydrated salt of sodium thiosulfate.

| Sample | F | G | H |
|---|---|---|---|
| Sodium Thiosulfate Pentahydrate (4.0 mmols) | 1.0 | 0 | 0 |
| Sodium thiosulfate (anhydrous) (4.0 mmols) | 0 | 0.64 | 0 |
| Monsanto Rheometer 1° Arc, 150° C. | | | |
| $M_{HF}$ Torque Unite (dNm) | 32 | 32.5 | 31.5 |
| $M_L$ Torque Unites (dNm) | 8 | 7.5 | 7.3 |
| $M_{HF}$—$M_L$ Torque Units (dNm) | 24 | 25 | 24.2 |
| Cure Time, t'c(25), min | 8.5 | 21 | 19.7 |
| Cure Time, t'c(90), min, | 17.5 | 31.8 | 29.5 |
| % Reduction in t'c(90) cure time | 40.7 | none | |

EXAMPLE III

In this example, sodium thiosulfate pentahydrate is evaluated as a cure activator for a variety of sulfenamide-type accelerators. The rubber compositions are identified herein as Samples I, J, K, L, M, N, O, P, Q and R of Table 4 with Sample I, K, M, O and Q acting as the control compounds containing no sodium thiosulfate pentahydrate, and Samples J, L, N, P and R contain sodium thiosulfate pentahydrate at 0.50 phr. Table 4 illustrates the cure activating power of sodium thiosulfate pentahydrate when used in conjunction with sulfenamide-type accelerators. Cure time reductions of 29.5 percent, 33.3 percent, 14.2 percent and 27.5 percent were respectively obtained when 0.5 phr of sodium thiosulfate pentahydrate was added to the formulations containing CBS (Sample J versus Sample I), TBBS (Sample L versus Sample K), DCBS (Sample N versus Sample M) and TBSI (Sample P versus Sample O). The use of sodium thiosulfate pentahydrate with MBTS did not provide any reduction in t'c(90) cure time. This shows that to be useful in reducing cure times, a sulfenamide accelerator should be present as part of the cure system.

TABLE 4

| Sample | I | J | K | L | M | N | O | P | Control Q | R |
|---|---|---|---|---|---|---|---|---|---|---|
| Accelerator (1.25 phr) | CBS | CBS | TBBS | TBBS | DCBS | DCBS | TBSI | TBSI | MBTS | MBTS |
| Sodium Thiosulfate Pentahydrate | 0 | 0.50 | 0 | 0.50 | 0 | 0.50 | 0 | 0.50 | 0 | 0.50 |
| Monsanto Rheometer 1° Arc, 150° C. | | | | | | | | | | |
| $M_{HF}$ Torque Units (dNm) | 30.0 | 30.0 | 31.0 | 30.5 | 27.0 | 27.0 | 31.0 | 31.5 | 27.0 | 26.2 |
| $M_L$ Torque Units (dNm) | 8.0 | 7.5 | 7.0 | 7.0 | 7.0 | 7.5 | 7.0 | 8.0 | 6.0 | 6.0 |
| $M_{HF}$—$M_L$ Torque Units (dNm) | 22.0 | 22.5 | 24.0 | 23.5 | 20.0 | 19.5 | 24.0 | 23.5 | 21.0 | 20.2 |
| Cure Time, t'c(25), min | 14.0 | 8.0 | 17.0 | 9.5 | 23.5 | 19.0 | 22.0 | 13.0 | 9.5 | 6.0 |
| Cure Time, t'c(90), min | 22.0 | 15.5 | 25.5 | 17.0 | 42.0 | 36.0 | 34.5 | 25.0 | 34.0 | 34.0 |
| % Reduction in t'c(90) cure time | | 29.5 | | 33.3 | | 14.2 | | 27.5 | | none |
| Stress-Strain Data | | | | | | | | | | |
| Modulus at 300% Elongation, MPa | 6.86 | 6.77 | 7.39 | 7.3 | 4.84 | 5.16 | 6.75 | 7.13 | 5.46 | 5.12 |
| Tensile Strength, MPa | 19.05 | 18.99 | 19.51 | 19.07 | 19.41 | 19.66 | 19.27 | 20.4 | 19.8 | 19.37 |
| Elongation at Break, % | 614 | 612 | 600 | 593 | 744 | 727 | 622 | 629 | 708 | 721 |
| Shore A Hardness at 100° C. | 47.7 60.8 | 47.4 61.3 | 49 | 48.7 | 43.4 | 43.9 | 47.5 | 48.2 | 43.6 | 42.6 |
| Percent Rebound at 100° C. | 60.4 | 60.9 | 61.3 | 60.9 | 56.8 | 56.2 | 60.8 | 61.3 | 58.1 | 56 |

CBS = N-cyclohexyl-2-benzothiazolesulfenamide
TBBS = N-tert-butyl-2-benzothiazolesulfenamide
DCBS = N,N-dicyclohexyl-2-benzothiazolesulfenamide
TBSI = N-tert-butyl bis-2(2-benzothiazolesulfen)amide, Santocure ® TBSI
MBTS = 2,2'-dithiobisbenzothiazole, (Altax)

EXAMPLE IV

In this example, the vulcanizing activity of sodium thiosulfate pentahydrate is evaluated. Sample V illustrates sodium thiosulfate pentahydrate's vulcanizing activity in the sulfur vulcanizable rubber of Table 1 when no sulfur or sulfenamide accelerator such as CBS is present. As can be seen by the data, no cure takes place in the absent of sulfur and sulfenamide accelerator. Likewise as Sample W illustrates, no useful vulcanizate can be obtained when sodium thiosulfate pentahydrate and a sulfenamide accelerator such as CBS is cured in the absence of sulfur. When sulfur is added to the sulfur vulcanizable rubber composition of Sample W to produce Sample Y, a useful cure time reduction of 17.5 minutes is noted. Also, useful mechanical properties for the vulcanizate are obtained when sulfur is added to the sulfur vulcanizable rubber composition of Sample W providing large improvements in modulus at 300 percent elongation, tensile strength, elongation at break, hardness and percent rebound.

TABLE 5

| Sample | V | W | X | Y |
|---|---|---|---|---|
| CBS[1] | | 1.25 | 1.25 | 1.25 |
| sodium thiosulfate pentahydrate | 0.5 | 0.5 | | 0.5 |
| Sulfur | | | 1.75 | 1.75 |

TABLE 5-continued

| Sample | V | W | X | Y |
|---|---|---|---|---|
| Monsanto Rheometer 1° Arc, 150° C. | | | | |
| $M_{HF}$ Torque Units (dNm) | No Cure | 10 | 30 | 30 |
| $M_L$ Torque Units (dNm) | No Cure | 5 | 4.5 | 5 |
| $M_{HF}$—$M_L$ Torque Units (dNm) | No Cure | 5 | 25.5 | 25 |
| Cure Time, t'c(25), min | No Cure | 12 | 15 | 8.2 |
| Cure Time, t'c(90), min | No Cure | 35 | 22 | 17.5 |
| Stress-Strain Data | | | | |
| Modulus at 300% Elongation, MPa | | 0.8 | 7.55 | 7.19 |
| Tensile Strength, MPa | 0.34 | 4.87 | 17.88 | 18.62 |
| Elongation at Break, % | 284 | 1062 | 561 | 589 |
| Shore A Hardness at 100° C. | 5.8 | 16.8 | 48.4 | 47.4 |
| Percent Rebound at 100° C. | 31.4 | 34.6 | 61.3 | 60.8 |

[1]N-cyclohexyl-2-benzothiazesulfenamide

EXAMPLE V

In this example, other hydrated salts of thiosulfate are evaluated for cure activating potential. The rubber compositions are identified herein as Samples Z, AB, AC and AD of Table 6 with Sample Z acting as the control compound containing no hydrated salt of thiosulfate, Sample AB containing 4.0 mmoles of potassium thiosulfate hydrate (1.5 moles of water), Sample AC containing 4.0 mmols of magnesium thiosulfate hexahydrate and Sample AD containing 4.0 mmols of sodium thiosulfate pentahydrate. In each example, cure time reductions are observed when compared the control with sodium thiosulfate pentahydrate giving the greatest reduction in cure times.

TABLE 6

| Samples | Z | AB | AC | AD |
|---|---|---|---|---|
| potassium thiosulfate hydrate[1] 4.0 mmols (phr) | | 0.88 | | |
| magnesium thiosulfate hexahydrate 4.0 mmols (phr) | | | 1 | |
| sodium thiosulfate pentahydrate 4.0 mmols (phr) | | | | 1 |
| Monsanto Rheometer 1° Arc, 150° C. | | | | |
| $M_{HF}$ Torque Units (dNm) | 30 | 31 | 28.5 | 29.5 |
| $M_L$ Torque Units (dNm) | 4.5 | 5 | 5 | 5 |
| $M_{HF}$—$M_L$ Torque Units (dNm) | 25.5 | 26 | 23.5 | 24.5 |
| Cure Time, t'c(25), min | 15 | 9.5 | 5.2 | 4.5 |
| Cure Time, t'c(90), min | 22 | 17 | 15 | 12 |
| % Reduction in t'(90) cure time | | 22.7 | 31.9 | 45.5 |
| Stress-Strain Data | | | | |
| Modulus at 300% Elongation, MPa | 7.55 | 7.51 | 6.51 | 7.26 |
| Tensile Strength, MPa | 17.88 | 16.83 | 17.44 | 19.0 |
| Elongation at Break, % | 561 | 543 | 604 | 603 |

[1]$K_2S_2O_3 \cdot 1.5 H_2O$

What is claimed is:

1. A method for increasing the rate of vulcanization of a sulfur vulcanizable rubber composition by heating a sulfur vulcanizable composition to a temperature ranging from 100° C. to 200° C., said rubber composition comprising (a) a sulfur vulcanizable rubber
   (b) from 0.5 phr to 5 phr of a sulfenamide compound of the general formula:

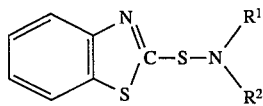

wherein $R^1$ is hydrogen, an acyclic aliphatic group having from about 1 to 10 carbon atoms, or a cyclic aliphatic group having from about 5 to 10 carbon atoms; and $R^2$ is hydrogen, a cyclic aliphatic group having from 5 to 10 carbon atoms or a mercaptobenzothiazolyl group of the formula:

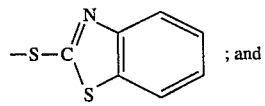 ; and (c) from 0.05 to 10 phr of a hydrated thiosulfate.

2. The method of claim 1 wherein said hydrated thiosulfate is selected from the group consisting of $BaS_2O_3 \cdot H_2O$, $K_2S_2O_3 \cdot 1.5$ $H_2O$, $CaS_2O_3 \cdot 6H_2O$, $MgS_2O_3 \cdot 6H_2O$, $NiS_2O_3 \cdot 6H_2O$, $CoS_2O_3 \cdot 6H_2O$, $SrS_2O_3 \cdot 5H_2O$, $Na_2S_2O_3 \cdot 5H_2O$, $MnS_2O_3 \cdot 5H_2O$, $Li_2S_2O_3 \cdot 3H_2O$ and $CdS_2O_3 \cdot 5H_2O$.

3. The method of claim 2 wherein said hydrated thiosulfate is $Na_2S_2O_3 \cdot 5H_2O$.

4. The method of claim 3 wherein said $Na_2S_2O_3 \cdot 5H_2O$ is present in an amount ranging from 0.10 to 5.0 phr.

5. The method of claim 1 wherein a sulfur vulcanizing agent is present in said sulfur vulcanizable rubber composition and is selected from the group consisting of elemental sulfur, an amine disulfide, polymeric polysulfide and sulfur olefin adducts.

6. The method of claim 5 wherein said sulfur vulcanizing agent is present in an amount ranging from 0.5 to 8 phr.

7. The method of claim 1 wherein said sulfenamide compound is selected from the group consisting of N-cyclohexyl-2-benzothiazylsulfenamide, N-isopropyl-2-benzothiazylsulfenamide, N-t-butyl-2-benzothiazyl-sulfenamide, N-t-butyl bis-(2-benzothiazylsulfen)amide and N,N-dicyclohexyl-2-benzothiazylsulfenamide.

8. The method of claim 5 said sulfenamide compound is added to said vulcanizable rubber composition in amounts ranging from 0.7 to 2 phr.

9. The method of claim 1 wherein said sulfur vulcanizable rubber is an elastomer containing olefinic unsaturation and is selected from the group consisting of natural rubber, neoprene, polyisoprene, butyl rubber, polybutadiene, styrene-butadiene copolymer, styrene-isoprene copolymer, styrene-isoprene-butadiene terpolymer, methyl methacrylate-butadiene copolymer, isoprene-styrene copolymer, methyl methacrylate-isoprene copolymer, acrylonitrile-isoprene copolymer, acrylonitrile-butadiene copolymer, ethylene-propylene-diene monomer rubber and mixtures thereof.

10. A sulfur vulcanizable rubber composition comprising
   (a) a sulfur vulcanizable rubber
   (b) from 0.5 phr to 5 phr of a sulfenamide compound of the general formula:

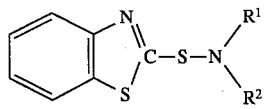

wherein $R^1$ is hydrogen, an acyclic aliphatic group having from about 1 to 10 carbon atoms, or a cyclic aliphatic group having from about 5 to 10 carbon atoms; and $R^2$ is hydrogen, a cyclic aliphatic group having from 5 to 10 carbon atoms or a mercaptobenzothiazolyl group of the formula:

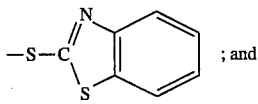 ; and (c) from 0.05 to 10 phr of a hydrated thiosulfate.

11. The composition of claim 10 wherein said hydrated thiosulfate is selected from the group consisting of $BaS_2O_3 \cdot H_2O$, $K_2S_2O_3 \cdot 1.5$ $H_2O$, $CaS_2O_3 \cdot 6H_2O$, $MgS_2O_3 \cdot 6H_2O$, $NiS_2O_3 \cdot 6H_2O$, $CoS_2O_3 \cdot 6H_2O$, $SrS_2O_3 \cdot 5H_2O$, $Na_2S_2O_3 \cdot 5H_2O$, $MnS_2O_3 \cdot 5H_2O$, $Li_2S_2O_3 \cdot 3H_2O$ and $CdS_2O_3 \cdot 5H_2O$.

12. The composition of claim 11 wherein said hydrated thiosulfate is $Na_2S_2O_3 \cdot 5H_2O$.

13. The composition of claim 12 wherein said $Na_2S_2O_3 \cdot 5H_2O$ is present in an amount ranging from 0.10 to 5.0 phr.

14. The composition of claim 10 wherein a sulfur vulcanizing agent is present in said sulfur vulcanizable rubber composition and is selected from the group consisting of elemental sulfur, an amine disulfide, polymeric polysulfide and sulfur olefin adducts.

15. The composition of claim 14 wherein said sulfur vulcanizing agent is present in an amount ranging from 0.5 to 8 phr.

16. The composition of claim 10 wherein said sulfenamide is present in an amount ranging from 0.7 to 2 phr.

17. The composition of claim 10 wherein said sulfur vulcanizable rubber is an elastomer containing olefinic unsaturation and is selected from the group consisting of natural rubber, neoprene, polyisoprene, butyl rubber, polybutadiene, styrene-butadiene copolymer, styrene-isoprene copolymer, styrene-isoprene-butadiene terpolymer, methyl methacrylate-butadiene copolymer, isoprene-styrene copolymer, methyl methacrylate-isoprene copolymer, acrylonitrile-isoprene copolymer, acrylonitrile-butadiene copolymer, ethylene-propylene-diene monomer rubber and mixtures thereof.

18. A sulfur vulcanized rubber composition which is prepared by heating the sulfur vulcanizable rubber composition of claim 10 to a temperature ranging from 100° C. to 200° C.

* * * * *

UNITED STATES PATENT AND TRADEMARK OFFICE
CERTIFICATE OF CORRECTION

PATENT NO. : 5,594,052
DATED : January 14, 1997
INVENTOR(S) : D'Sidocky et al

It is certified that error appears in the above-indentified patent and that said Letters Patent is hereby corrected as shown below:

Title page item [54], title, lines 2 and 3, cancel beginning with "SODIUM THIOSULFATE PENTAHYDRATE" and insert --HYDRATED THIOSULFATE--.

Column 1, lines 2-3, cancel beginning with "SODIUM THIOSULFATE PENTAHYDRATE" and insert --HYDRATED THIOSULFATE--.

Column 9, line 7, cancel "69.75" and insert --68.75--; line 30, cancel "date" and insert --data--.

Columns 11 and 12, in Table 4, line 31, delete "60.8   61.3".

Signed and Sealed this

Twenty-fourth Day of June, 1997

Attest:

BRUCE LEHMAN

*Attesting Officer*     *Commissioner of Patents and Trademarks*